May 10, 1927.                        W. H. POWELL                        1,628,611
                  DYNAMO ELECTRIC MACHINE AND WINDING THEREFOR
                       Filed May 16, 1924          5 Sheets-Sheet 1

Inventor
W. H. Powell
by
Attorney

May 10, 1927.　　　　W. H. POWELL　　　　1,628,611
DYNAMO ELECTRIC MACHINE AND WINDING THEREFOR
Filed May 16, 1924　　　　5 Sheets-Sheet 5

Inventor
W. H. Powell
by
Attorney

Patented May 10, 1927.

1,628,611

UNITED STATES PATENT OFFICE.

WILLIAM H. POWELL, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

DYNAMO-ELECTRIC MACHINE AND WINDING THEREFOR.

Application filed May 16, 1924. Serial No. 713,723.

This invention relates to dynamo electric machines and windings therefor.

In dynamo electric machines, particularly of the multipolar type, it is of course the aim of the designer to cause the field flux provided by the respective poles to be of the same value in order that voltages induced in and the currents flowing in the various armature paths may have the same value. For various reasons, however, there may be inequality of field fluxes, and this and probably also some inequality in resistances in the various armature paths may result in inequality of currents in these paths. This of course may result in unduly heating the armature coils and reduction in the efficiency of the machine. Sparking and flashing at the commutator may also result which is of course highly undesirable. In machines of large capacity moreover the various limiting factors in design play an important part and have limited the size and capacity.

In windings of the simplex lap type equalization of the currents in the various armature paths has been more or less satisfactorily accomplished by what are termed in the art as cross connectors. These cross connectors are elements which are bodily added to the lap winding itself and preferably connected between points on the winding which are theoretically at the same potential. If in the operation of the machine points so connected tend to assume a different potential then equalizing currents will flow in the cross connectors.

In multiplex lap windings a further difficulty presents itself in that it is not enough that the currents in the various armature paths of any individual lap winding should be equalized but that these currents should also be equalized with the current in the corresponding paths of the other independent lap windings. Furthermore, if there are $m$ windings the potential difference between adjacent commutator bars should not be greater than substantially $\frac{1}{m}$ th of the electromotive force generated by a single winding element or coil if the machine is to operate successfully. Applicant solved this problem by a new type of winding as set forth in his application Serial No. 286,161, filed March 27, 1919, patented June 24, 1924, No. 1,499,076.

The term electromotive force will hereinafter be abbreviated E. M. F.

For most perfect equalization of the currents and potentials in an armature winding of the types hitherto known every segment of the commutator should be connected by cross connectors to every other segment theoretically at the same potential. The addition of cross connectors of course increases the cost of a given machine not only by reason of the added copper but of the added work in making the connections. At times, less than all of the commutator segments are connected to cross connectors for this reason, but even so the added expense is considerable and of course equalization is not as perfect as it might be with all segments cross connected.

One object of the present invention is the provision of an armature winding in which the currents in the various armature paths will be equalized without the use of cross connectors. Another object is the provision of an armature winding in which the potential rise from one brush to another measured from bar to bar of the commutator will form a substantially smooth curve.

A more specific object is the provision of an armature winding of the multiplex type in which the currents in the various armature paths will be equalized; and also in which the potential difference between adjacent commutator segments will not be greater than $\frac{1}{m}$ th of the E. M. F. generated by a single winding element or coil, if there are $m$ windings of a given type, all without the use of cross connectors.

A further object is the provision of an armature winding in which more perfect equalization is secured than by the use of prior art cross connectors.

Still another object is the provision of an armature winding which will be efficient in operation and relatively inexpensive. Other objects will appear hereinafter as the description of the invention proceeds.

The novel features of the invention will appear from this specification and the accompanying drawings showing several embodiments thereof and forming part of this specification and all these novel features are intended to be pointed out in the claims.

Figure 1:
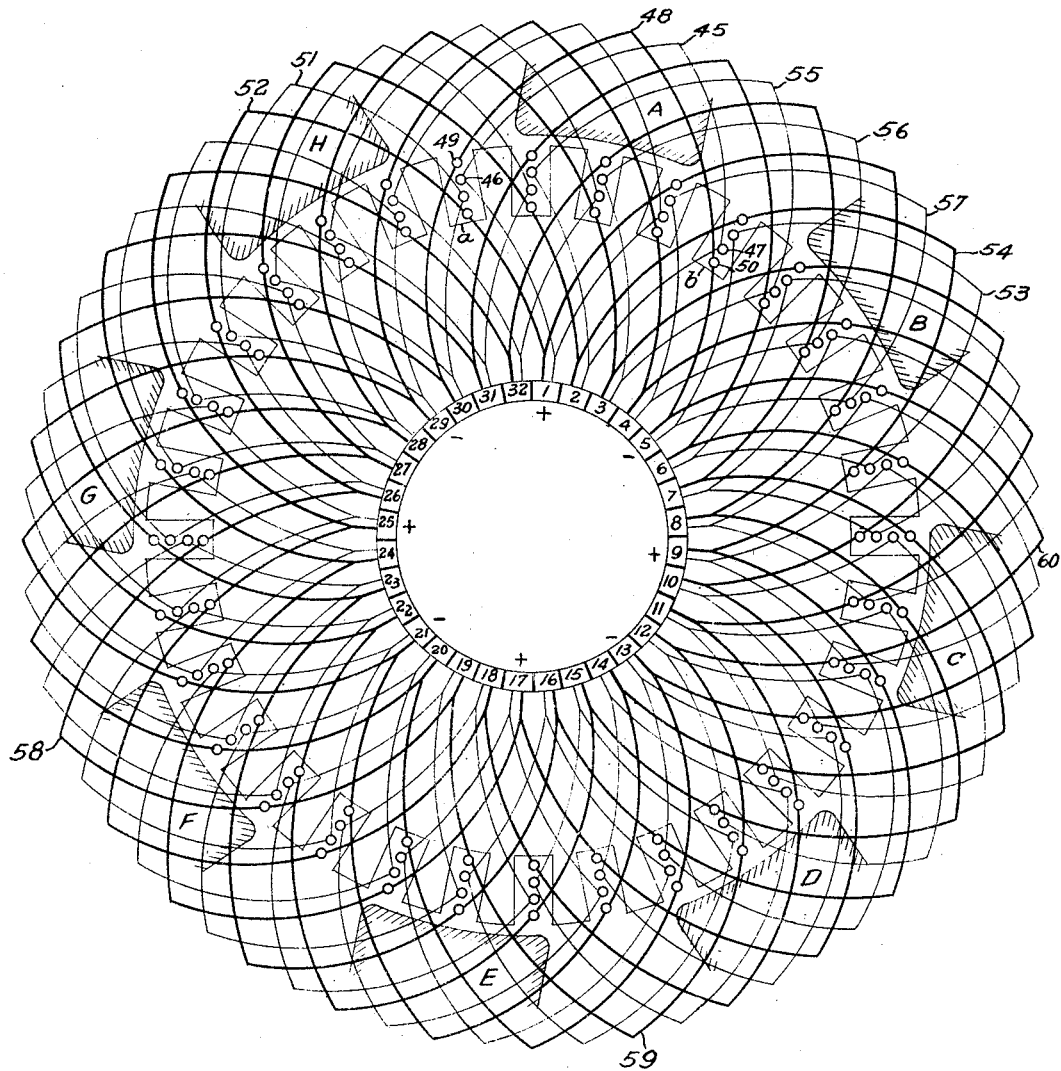
Fig. 1 is a diagrammatic showing of a dynamo electric machine embodying the invention as it may be applied in combination with a winding of the simplex lap type.

Referring to Fig. 1, the machine here illustrated is provided with eight poles A, B, C, D, E, F, G, H. The armature is here shown as of the slotted type, the number of slots being 32 and the commutator segments or bars of the same number. Each slot is shown as containing four conductors and as each conductor represents one side of a coil or winding element, there is a total of 64 coils all connected to the same commutator. Of the 64 coils, 32 coils are wound in the form of a simplex lap winding and the remaining 32 coils are wound in the form of a wave winding. The wave winding here shown is of the simplex type inasmuch as all of the conductors are included in tracing from a given starting point back to the same starting point, but it is quadruply reentrant and therefor has eight circuits, which is the same as the number of circuits in the lap winding. It is of course to be understood that the invention is not at all restricted to any specific number of poles, slots, coils and commutator bars and that the various embodiments described in this specification are merely illustrative of the manner in which the invention may be practiced.

Considering the winding of Fig. 1 more specifically, it will be noted that a given lap coil, as for example coil 45, has one of its coil sides 46 in slot $a$. In considering the position of the conductors or coil sides in a slot the radially outermost conductor may be designated as disposed in position No. 1, the next conductor, counting radially inwards, as No. 2 and so on. Coil side 46 is thus in position No. 2. The other coil side 47 of coil 45 is in position No. 3 in a slot $b$ which, in the present instance, is four slots from slot $a$. As there are 32 slots and 8 poles and therefore 4 slots per pole, the winding is a full pitch winding. The back conductor pitch of both the lap and wave coils is 9. The front conductor pitch of the wave coils is 5 and of the lap coils 7.

All of the lap coils are positioned in the slots similarly to coil 45, that is, they are in positions Nos. 2 and 3. This is however not essential; the lap coils could, for example, occupy positions Nos. 1 and 4. It is moreover not essential that the winding be a full pitch one, as illustrated in Fig. 2.

Considering a coil 48 of the wave winding, this has a coil side 49 disposed in position No. 1 of slot $a$, and another coil side 50 disposed in position No. 4 of slot $b$. The slot pitch of this coil is therefore also 4 in this instance. Lap coil 45 and wave coil 48 thus account for positions Nos. 1 and 2 in slot $a$ and positions Nos. 3 and 4 in slot $b$. It is therefore clear that these coils may be taped up together and the unit thus formed may be laid in the slots in the same manner as is the practice with an ordinary lap coil. It will be noted that the front end-connectors of lap coil 45 run toward each other and are connected to commutator bars 1 and 2. The front end-connectors of wave coil 48 diverge relatively and are connected to commutator bars 30 and 5. It is therefore clear that with the consideration of lap coil 45 and wave coil 48 all of the coils in the winding are accounted for because all of the other similar pairs of lap and wave coils are similarly located in the successive slots.

Figure 2:
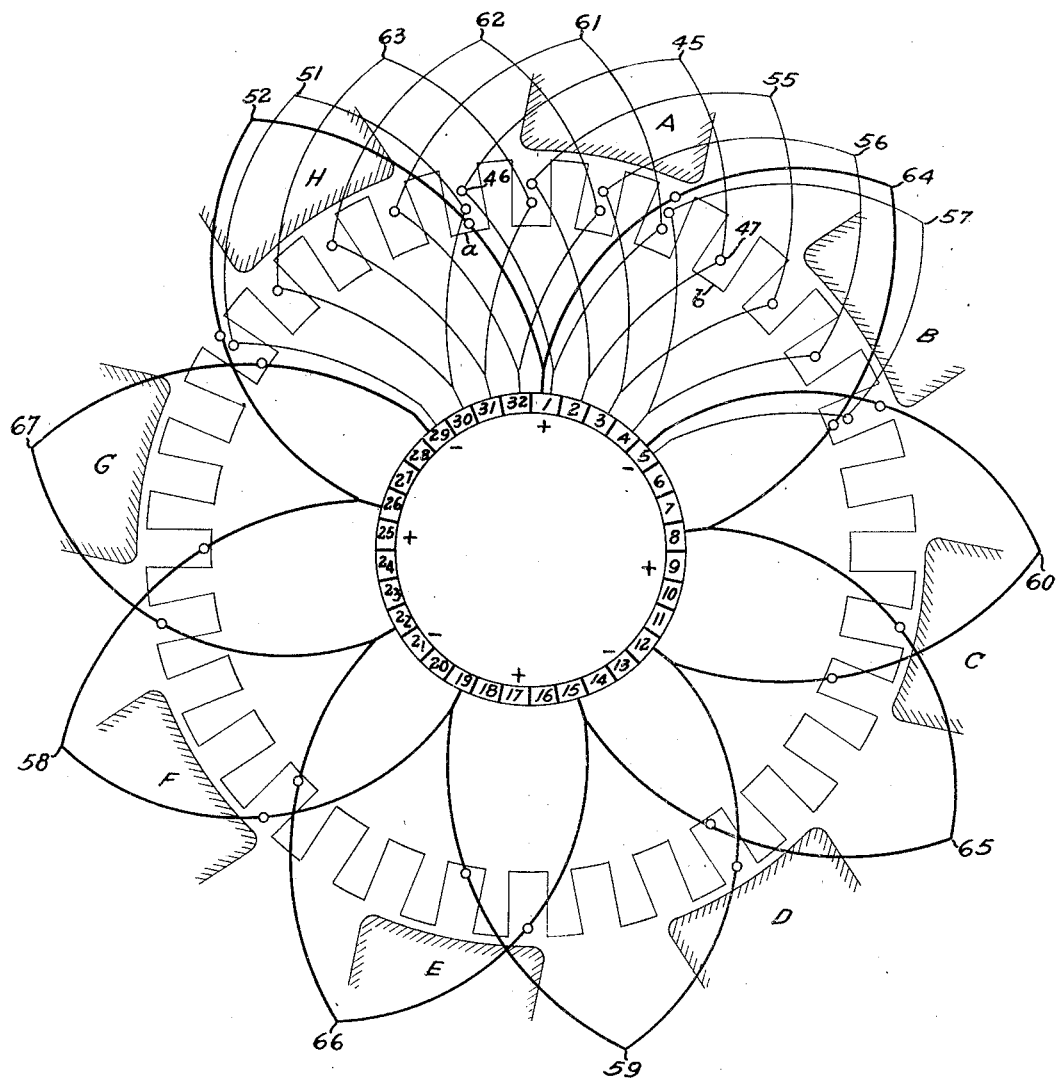
Fig. 2 is a diagram of a portion of the machine illustrated in Fig. 1.

In order that the relation of the lap coils and wave coils and their interaction may be more clearly understood reference may be had to Fig. 2 in which a portion only of the lap and wave coils of the machine illustrated in Fig. 1 have been shown. Assuming that commutator bar 1 is under a positive brush and if we now trace from bar 1 to conductor 46 continuing through lap coil 45 to segment 2 and further continuing through lap coils 55, 56 and 57 we come to bar 5 which, in this particular machine, would be under a negative brush if bar 1 is under a positive brush. Beginning again at bar 1 and tracing through wave coil 52 we come to bar 26; from there through coil 58 to bar 19, from there through coil 59 to bar 12 and from there through coil 60 to bar 5. It will thus be seen that in this machine there is a group of 4 lap coils the terminals of said group being connected to bars 1 and 5. To the same bars are connected the respective terminals of a group of 4 wave coils. It will be furthermore noted (with the armature in the position relative to the poles as shown) that wave coil 52 occupies a position with respect to poles G H A the same as lap coil 45 with respect to poles H A B. Wave coil 58 occupies the same position with respect to poles F and G as does lap coil 55 with respect to poles A and B. Wave coil 59 occupies the same position with respect to poles D and E as does lap coil 56 with respect to poles A and B. Wave coil 60 occupies the same position with respect to poles B and C as does lap coil 57 with respect to poles A and B. It is therefore evident that for any position of the armature with respect to the poles a group of four lap coils such as 45, 55, 56 and 57 will generate an E. M. F. which, in this particular machine, is dependent upon the field flux generated, in general, by two adjacent poles, whereas four wave coils 52, 58, 59 and 60 will generate an E. M. F. which represents the average of all of the pairs of poles. In view of the similar disposition of the respective lap and wave coils with respect to the poles, it is obvious that the potential difference of any given group of successive wave coils will be so nearly like that of the associated group of lap coils the terminals of which are connected to the same respective commutator bars that if any difference exists it will be negligible. Beginning again at commutator bar No. 1 and tracing through lap coils 61, 62, 63 and 51 we come to commutator bar 29 which in this machine is under a negative brush. The group of wave coils which is associated with the lap coils just traced comprises coils 64, 65, 66 and 67, the terminals of this group being connected respectively to bars 1 and 29. It is clear that in connection with these two groups of wave and lap coils the E. M. F. generated by the respective groups will be substantially the same. From this consideration it will be seen that between bar 1 and bar 5 there are two current paths in the armature, one through a lap winding and one through a wave winding. The same is true with respect to bars 1 and 29. In this particular machine there is a total of eight current paths in the lap winding and eight current paths in the wave winding.

Analyzing the winding of Figs. 1 and 2 still further, it will be noted that bar 1 has connected thereto lap coil 61 and wave coil 64 both generating the same E. M. F. Bar 1 has also connected thereto lap coil 45 generating the same E. M. F. as wave coil 52. As will be seen by reference to Fig. 1, every bar in the commutator has two pairs of coils connected thereto generating the same E. M. F.'s in the respective pairs.

Just as there is a group of four lap coils and a group of four wave coils the terminals of which are connected respectively to commutator bars 1 and 5 so there is also a group of four lap coils and a group of four wave coils the terminals of which are connected respectively to commutator bars 2 and 6. The same thing of course applies all the way around the commutator. The connections of the winding are therefore such that the potential rise from one brush to another measured from bar to bar forms a substantially smooth curve.

Bars 1, 9, 17 and 25, for example, are equipotential points. Considering a single path of current flow (referring to Fig. 1) between segments 1 and 9 for example, we have, beginning at bar 1, lap coil 45 extending to segment 2 and this segment also has connected thereto one terminal of wave coil 54 the other terminal of which is connected to bar 9. Lap coil 45 and wave coil 54 are disposed with respect to the pole pieces to generate the same E. M. F. and, with respect to segments 1 and 9, are in opposition to each other. As has been hereinbefore pointed out the various coils forming the winding as a whole are so thoroughly balanced against each other that the various potentials are equalized in an efficient manner but it is clear that in case the potential of bars 1 and 9 is not exactly the same an equalizing current will flow through coils 45 and 54 between these segments. An inspection of Fig. 1 will show that each individual commutator bar is connected in the manner hereinbefore noted to every other bar 360 electrical degrees from it which should operate at the same potential.

As hereinbefore noted the winding shown in Figs. 1 and 2 is a full pitch winding, the slot pitch of the wave and lap coils being the same. This is however not essential. For example, a winding might be made having 28 lap coils and 28 wave coils disposed on an armature having 28 slots and 28 commutator bars. In this case the slot pitch of the lap coils would be 3 and that of the wave coils 4. The pitch between the left hand coil side of a wave coil in this winding (corresponding to wave coil 52 for example) with respect to the right hand coil side of the lap coil (corresponding to coil 45) would therefore be 7, that is, the total pitch of the wave and lap coils noted would be equal to the number of slots per pair of poles so that, just as in the winding of Fig. 1, these coils would generate the same E. M. F. Equalization of potentials and currents would be attained in the same manner as described in connection with Fig. 1. It may be here noted that for this particular winding, the wave winding component thereof would be of the duplex type, that is, when one half of the conductors alloted to the wave winding have been traced through, the winding would re-enter at the bar originally started from. The remaining conductors would form an independent wave winding. The lap winding and wave windings thus serve as mutual equalizers.

Figure 3:
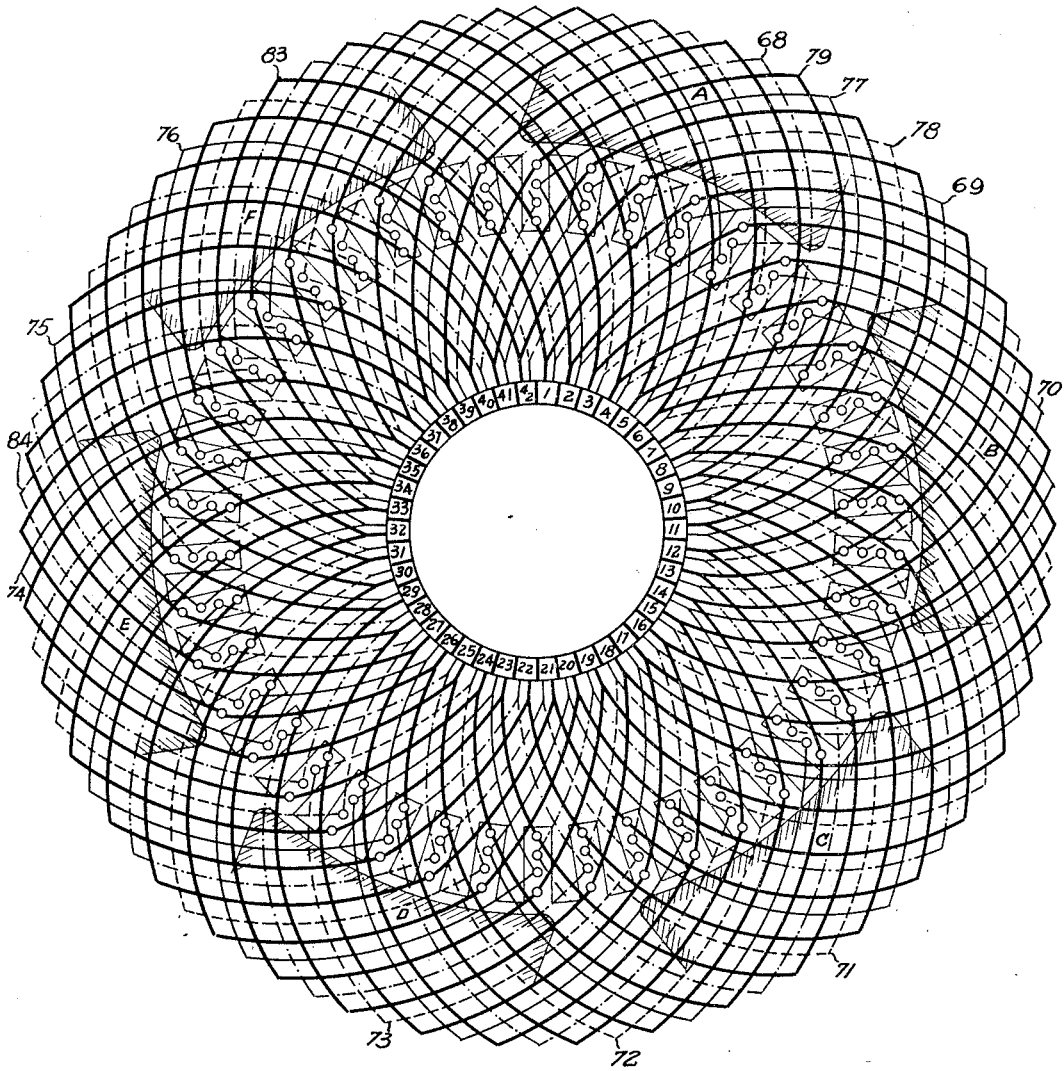
Fig. 3 is a diagrammatic showing of a dynamo electric machine embodying the invention as it may be applied in combination with a winding of the triplex lap type.

Referring now to Fig. 3, the machine here shown is provided with 6 poles, A, B, C, D, E, F, and an armature having 42 slots and 42 commutator bars. There are here shown four conductors in each slot, and the conductors occupying, in this instance, positions Nos. 2 and 3, are connected up to form a triplex lap winding. Beginning at bar 1 for example, is a lap winding indicated by the dot-and-dash lines (68). If this winding be traced through only one-third of the coils in positions Nos. 2 and 3 will be traversed. Beginning at bar 2 is a lap winding indicated by the light full lines (77). Tracing through this winding will account for another one-third of the coils in the positions Nos. 2 and 3. Beginning at bar 3 is another lap winding indicated by the dotted lines (78) and tracing through this winding will account for the remaining one-third of the lap coils. These three lap windings are thus independent. The number of slots, poles, commutator bars and coils per slot has been so selected for this triplex lap winding as to satisfy the condition laid down in applicant's copending application hereinbefore referred to, that is, that the number of coils divided by the number of pairs of poles is an integer not divisible by the number of independent windings, and that the number of coils per slot be prime to the number of windings. Also disposed in the slots is a wave winding and as will be clearly apparent from Fig. 3 all of the remaining conductors in the slots will be traced through by beginning with any of the commutator bars and following the heavy full lines (79) leading to conductors in positions Nos. 1 and 4 in the slots.

The triplex lap winding has three times as many circuits as there are poles, that is, there are 18 circuits total. The wave winding is here shown of simplex type but it reenters nine times and it therefor has at many circuits as the triplex lap winding.

Figure 4:
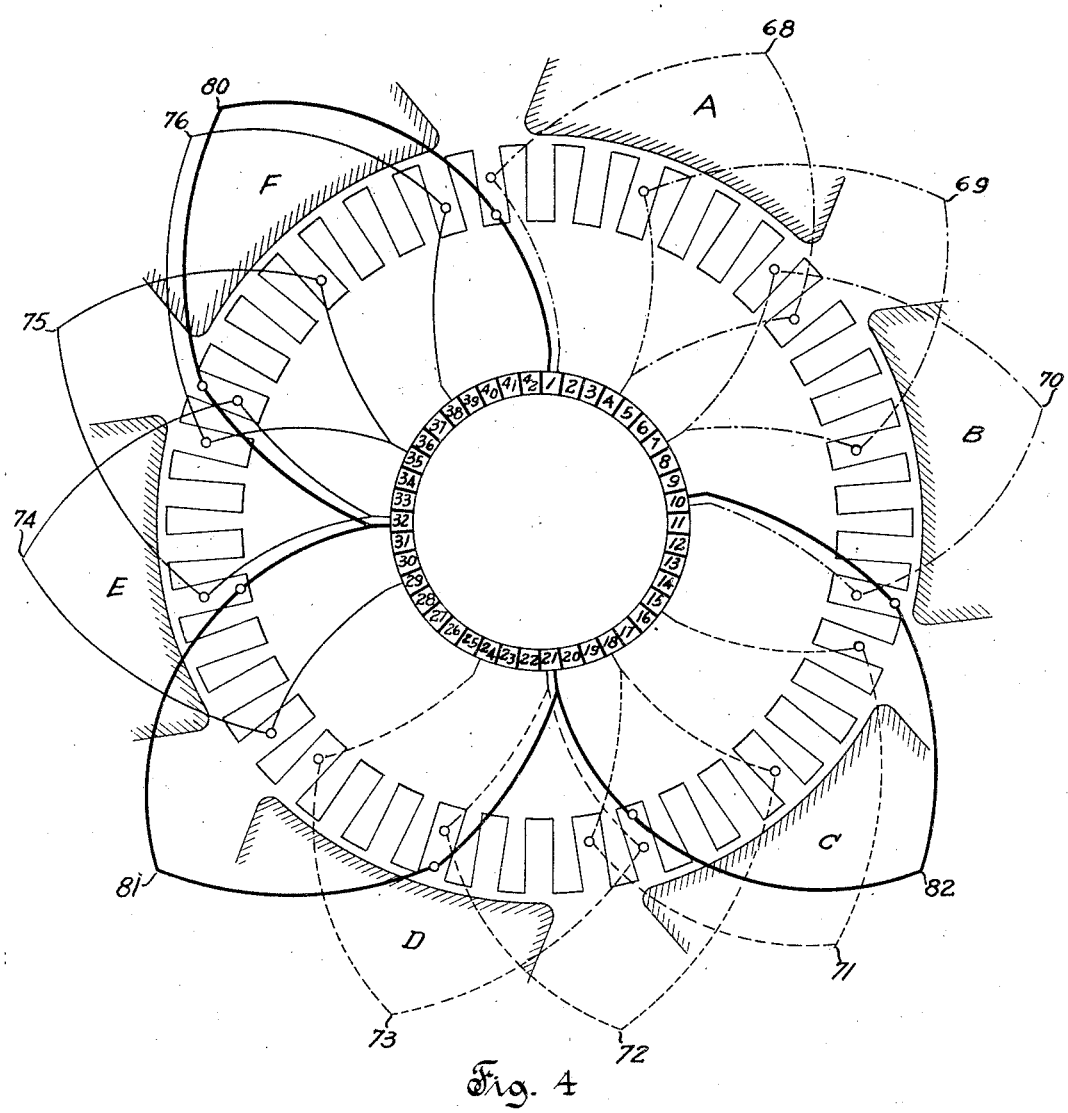
Fig. 4 is a diagram of a portion of the machine illustrated in Fig. 3.

For a clear understanding of the manner in which the winding as a whole is equalized as to potentials and currents, reference may be had to Fig. 4 in which a portion of the coils of the winding of Fig. 3 is shown. Beginning at bar 1 we may trace through a lap coil 68 to bar 4, through a lap coil 69 to bar 7, through a lap coil 70 to bar 10. Beginning again at bar 1 we may trace through a wave coil 80 to bar 32, through a wave coil 81 to bar 21, and through a wave coil 82 to bar 10. It will therefore be seen that the three lap coils 68, 69, 70 are balanced against the three wave coils 80, 81, 82. As was pointed out in connection with Figs. 1 and 2, for every lap coil there is also a wave coil disposed in a similar position with respect to the pole pieces. This is also true in the triplex lap-wave winding of Figs. 3 and 4. What has been stated in connection with lap coils 68, 69, 70 is also true with respect to any other group of three consecutive lap coils in any one of the three independent lap windings.

Inasmuch as the coils of the independent lap windings are disposed so that while a coil in one of the windings is in a certain position with respect to a pole there will be two other coils (in the case of a triplex winding) disposed in exactly the same position with respect to two other poles of the same polarity, we find in the present winding a group of three lap coils 71, 72, 73 in the dotted lap winding and a group of three lap coils 74, 75, 76 in the light full line lap winding disposed in exactly the same position with respect to poles C, D and E, F respectively as the group of three coils 68, 69, 70 are with respect to poles A, B. It is immediately apparent that the wave winding while serving to equalize the potential differences of the lap coils, group by group, also serves to interconnect the coils of the independent lap windings. For example, bars 1 and 29 are equipotential points and between these bars we have wave coil 80 from bar 1 to bar 32, and from bar 32 to bar 29 we have lap coil 74. Lap coil 74 and wave coil 80 are disposed so as to generate the same E. M. F. and these coils serve as an equalizing path in case there is any slight difference in the equipotential points 1 and 29. It will be evident that wave coils 81 and 82 serve as equalizing paths between coils of the light full line lap winding and the dotted lap winding and between the latter and the dot-and-dash lap winding respectively. The various independent lap windings are thus interconnected. It must of course be remembered that, for example, bars 2 and 30 are also equipotential points. Referring to Fig. 3 it will be seen that between these points we have a wave coil 83 and a lap coil 84. The same is true as to every individual bar in the commutator, that is, putting it in another way, between every two equipotential bars 360 electrical degrees apart there are interposed a lap coil and a wave coil in series generating equal and opposite potentials and each possible path for energizing current thus formed is between conductors in two different lap windings. It is thus apparent that the winding as a whole is thoroughly equalized and interconnected.

Just as in the case of the simplex lap-wave winding of Fig. 1, the wave winding of Figs. 3 and 4 has the same number of armature paths as the lap winding. In the particular instance illustrated in the latter figures the triplex lap winding has 18 paths and the wave winding the same number.

Figure 5:
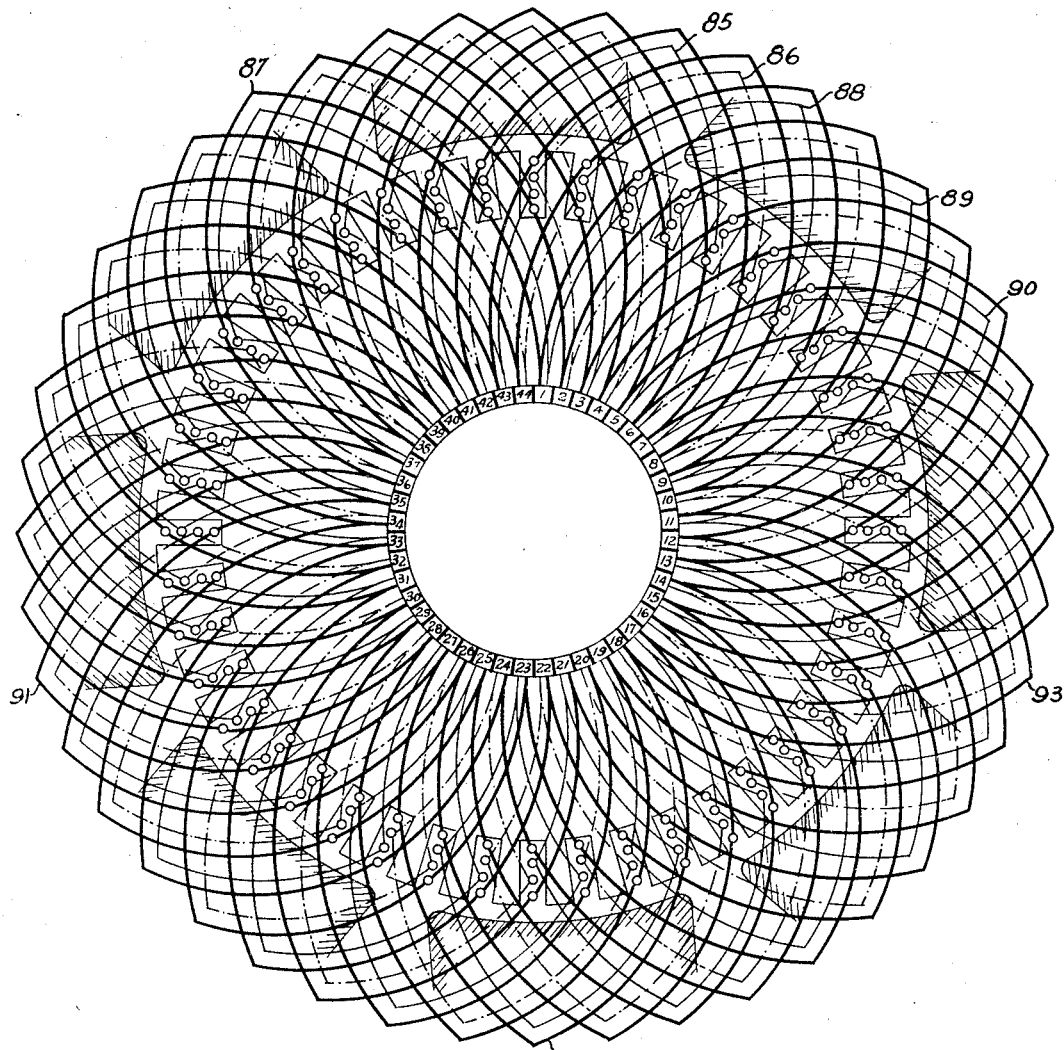
Fig. 5 is a diagrammatic showing of the dynamo electric machine embodying the invention as it may be applied in combination with a winding of the duplex lap type.

Referring now to Fig. 5, there is here diagrammatically shown an 8 pole machine provided with an armature having 44 slots and 44 commutator bars. There are 4 conductors per slot and one-half of these, those here shown in positions Nos. 2 and 3, are connected to form a duplex lap winding. One of these lap windings is indicated by the light full line winding 85 and the other by the light dot-and-dash winding 86. Here too the number of poles, slots, coils, etc. has been selected to satisfy the conditions laid down in applicant's copending application hereinbefore referred to. The remaining conductors, those here shown as in positions Nos. 1 and 4 are connected to form a wave winding indicated as the heavy full line winding 87. Taking lap coil 85 for example, which is connected to bars 1 and 3 it will be noted that wave coil 87 which has one terminal connected to bar 1, has the other terminal connected to bar 36. Inasmuch as bars 3 and 36 are equipotential points it is evident that coils 85 and 87 form a possible equalizing path between these points. It will be furthermore noted that bar 3 has coils of the light full line lap winding connected thereto whereas bar 36 has coils of the dot-and-dash lap winding connected thereto. It will be furthermore noted that though the slot pitch of coil 85 is 5 and the slot pitch of coil 87 is 6 these coils generate the same E. M. F. The sum of these two pitches, which is 11, is equal to the number of slots per pair of poles. It is therefore evident, as hereinbefore noted, that it is not necessary that the individual coils be full pitch. From the foregoing it will be observed that the individual wave coils thoroughly interconnect points in the different lap windings. The interconnection is of course mutual as between the lap and wave windings. The duplex lap winding has 16 circuits. The wave winding, here shown of simplex type, reenters eight times and therefore also has 16 circuits.

The E. M. F.'s generated by successive groups of lap coils are balanced against the E. M. F.'s generated by successive groups of wave coils having group terminals connected to the same commutator bars respectively in the same manner as already described in connection with Figs. 1 to 4. For example, lap coils 85, 88, 89, 90 of the light full line lap winding connected in succession to bars 1, 3, 5, 7, 9 are balanced against wave coils 87, 91, 92, 93, the terminals of this group of wave coils being connected to bars 1 and 9. The diagram clearly shows that the same is true of all other groups of successive lap coils in either of the lap windings. Here too the number of armature paths in the duplex lap winding is the same as the number of paths in the wave winding, namely, 16.

As to any of the hereinbefore described windings, or any other windings embodying the invention, it is not material whether the lap winding or the wave winding is considered the predominating winding. The current carrying capacity of the wave winding may be equal to, greater than or less than, that of the lap winding. If the cross sectional area of the conductors of the lap and wave coils is made the same then the lap and wave windings will of course carry working current of the same value. In any event it will be noted that while each winding serves as an equalizer for the other winding, each winding is also a working winding, that is, it carries its share of the output of the machine. The amount of working copper need obviously be no greater than would be necessary in an ordinary winding, but in the ordinary winding it would be necessary to bodily add the usual cross connectors, involving also added work in making the connections.

It is of course clear that the present invention may be also embodied in windings in which the lap winding component is of quadruplex type, or any multiplicity of windings.

In the hereinbefore described windings it has been assumed that the lap winding component would be made of the progressive type in which case the wave winding component is retrogressive. If the lap winding component is made retrogressive then the wave winding will be progressive.

It should be understood that it is not desired to limit the invention to the exact details of construction shown and described, for obvious modifications may occur to a person skilled in the art.

It is claimed and desired to secure by Letters Patent:

1. A multipolar dynamo-electric machine having a slotted armature, a winding for said armature including a lap winding and a wave winding, the front slot pitches of the winding elements of both of said windings being equal.

2. A multipolar dynamo-electric machine having an armature, a winding for said armature including a predetermined number of lap windings and a predetermined number of wave windings, the number of wave windings being such and the individual reentrancies such that the total number of circuits in said predetermined number of wave windings is equal to the total number of circuits in said predetermined number of lap windings.

3. A multipolar dynamo-electric machine having a slotted armature, a winding for said armature including a predetermined number of lap windings and a predetermined number of wave windings, the number of wave windings being such and the individual reentrancies thereof such that the total number of circuits in said predetermined number of wave windings is equal to the total number of circuits in said predetermined number of lap windings, the front slot pitches of the winding elements of both the lap and wave windings being equal.

4. A multipolar dynamo-electric machine having an armature, a winding for said armature including a lap winding and a simplex wave winding, said wave winding being multiply reentrant and having an average front and back conductor pitch equal to the difference between the number of conductors in said wave winding and the number of circuits in said lap winding divided by the number of poles.

5. A multipolar dynamo-electric machine having an armature, a winding for said armature including a predetermined number of lap windings and a simplex multiply reentrant wave winding, said wave winding having an average front and back conductor pitch equal to the difference between the number of conductors in said wave winding and the number of circuits in said predetermined number of lap windings divided by the number of poles.

6. A multipolar dynamo-electric machine having a slotted armature, a winding for said armature including a predetermined number of lap windings and a simplex multiply reentrant wave winding, said wave winding having an average front and back conductor pitch equal to the difference between the number of conductors in said wave winding and the number of circuits in said predetermined number of lap windings divided by the number of poles, the front slot pitches of the winding elements of both the lap and wave windings being equal.

7. A multipolar dynamo-electric machine having an armature of the commutator type, a winding for said armature including a lap winding and a wave winding, a group of consecutive lap coils of predetermined number, a group of consecutive wave coils of the same number, the terminals of said groups being connected to the same commutator segments, said group of wave coils being positioned with respect to the pairs of poles so that it is influenced by all of the pairs.

8. A multipolar dynamo-electric machine having a slotted armature of the commutator type, a winding for said armature including a lap winding and a wave winding, a group of consecutive lap coils of predetermined number, a group of consecutive wave coils of the same number, the terminals of said groups being connected to the same commutator segments, said group of wave coils being positioned with respect to the pairs of poles so that it is influenced by all of the pairs, the front slot pitches of the winding elements of both the lap and wave windings being equal.

9. A multipolar dynamo-electric machine having an armature, a lap type winding for said armature having predetermined coils disposed symmetrically relatively to the respective pairs of poles and load-current-carrying equalizing connections extending from the side of a coil nearest to the next succeeding similarly disposed coil to the nearest side of said next succeeding coil and from the opposite side of said latter coil to the nearest side of the next succeeding similarly disposed coil and so on to the first named coil.

10. A multipolar dynamo-electric machine having a commutator type armature, a winding for said armature including a predetermined number of lap windings and a predetermined number of wave windings, the commutator pitch of the winding elements of said predetermined number of wave windings being equal to the number of commutator segments per pair of poles minus the number of predetermined lap windings when the lap winding elements are progressive and plus the number of predetermined lap windings when said lap winding elements are retrogressive.

11. In a commutator type dynamo-electric machine having a slotted armature the number of slots per pole not being an integer, means for equalizing the currents in the armature winding including a lap winding and a wave winding both connected to said commutator, the coils of one of said windings being of short pitch and the coils of the other of long pitch.

12. In a commutator type dynamo-electric machine having a slotted armature the number of slots per pole not being an integer, an armature winding including a lap winding and a wave winding connected to the commutator, a group of consecutive lap coils of predetermined number, a group of consecutive wave coils of the same number, the terminals of said groups being connected to the same commutator segments, the coils of one of said windings being of short pitch and the coils of the other of long pitch.

13. In a commutator type dynamo-electric machine having a slotted armature the number of slots per pole not being an integer, an armature winding including a lap winding and a wave winding connected to the commutator, a group of consecutive lap coils disposed in said slots, a group of consecutive wave coils disposed in said slots to generate substantially the same E. M. F. as said lap coils, the terminals of said groups being connected to the same commutator segments.

14. In an armature winding for a slotted armature, a commutator, lap and wave armature coils connected to said commutator, every segment of said commutator being connected to two other segments through a lap coil and a wave coil said coils each having a side occupying a common slot and the sum of the slot pitches of said lap and wave coils being 360 electrical degrees.

15. In an armature winding for a slotted armature, a commutator, lap and wave armature coils connected to said commutator, every segment of said commutator being connected to two pairs of segments through armature coils, each pair of coils comprising a lap coil and a wave coil each coil of a given pair having a side occupying a common slot and the sum of the slot pitches of the coils of each pair being 360 electrical degrees.

16. A winding for dynamo electric machines including a plurality of independent lap windings and a simplex wave winding interconnecting said lap windings.

17. An armature winding for dynamo electric machines including a plurality of independent lap windings and a simplex wave winding interconnecting said lap windings, all connected to the same commutator.

18. An armature winding for dynamo electric machines including a plurality of independent lap windings and a simplex wave winding interconnecting said lap windings and having the same number of paths as the said plurality of lap windings, all of said windings being connected to the same commutator.

19. An armature winding for dynamo electric machines including a plurality of independent lap windings and a simplex wave winding, a group of lap coils of predetermined number in one winding, a group of wave coils of the same number, the respective terminals of said groups being connected to the same commutator segments, a second group of lap coils in another of said lap windings, a second group of wave coils of the same number as said second group of lap coils, the respective terminals of said second groups being connected to the same commutator segments, and certain of said wave coils serving to interconnect said groups of lap coils.

20. An armature winding for dynamo electric machines including a plurality of independent lap windings and a simplex wave winding a group of lap coils, a group of wave coils generating the same E. M. F. as said lap coils, the respective terminals of said groups being connected to the same commutator segments, a second group of lap coils in another of said lap windings, a second group of wave coils generating the same potential difference as said second group of lap coils, the respective terminals of said second groups being connected to the same commutator segments, and certain of said wave coils serving to interconnect said groups of lap coils.

21. A winding for dynamo electric machines including a plurality of independent lap windings, and one or more equalizing connections between said windings including one or more wave wound coils.

22. A winding for dynamo electric machines including a plurality of lap windings, and equalizing connections between said windings including active conductors.

23. A winding for dynamo electric machines including a plurality of lap windings, and equalizing connections between said windings including active conductors carrying normal current of the same value as conductors in one of said lap windings.

24. A multiplex lap winding for dynamo electric machines having a plurality of polar zones, comprising a plurality of imbricated independent windings the active conductors of one winding being arranged so that they are adapted to pass a given polar zone while active conductors of another winding are passing a similar polar zone and one or more equalizing connections between conductors of one winding and conductors of another winding including one or more active winding elements.

25. In combination, a slotted armature for dynamo electric machines, a plurality of lap windings in said slots the ratio of the number of slots to the number of pairs of poles being an integer not divisible by the number of windings and one or more equalizing connections between said windings including one or more active winding elements.

26. A multiplex lap winding for dynamo electric machines in which the ratio of the number of winding elements to the number of pairs of poles is an integer not divisible by the number of windings, and one or more equalizing connections between said windings including one or more active winding elements.

27. In a dynamo electric machine having a rotor and a commutator, means including a multiplex winding having $m$ windings disposed on said rotor, whereby the potential difference between adjacent commutator segments is reduced to substantially one $m$-th of the maximum voltage generated by the winding element of one of said windings, and means including one or more active winding elements for maintaining the segments at said potentials.

28. In combination, a slotted armature for dynamo electric machines, winding elements in said slots, the ratio of the number of slots to the number of pairs of poles being an integer, one-half of said winding elements being connected as a multiplex lap winding, the number of winding elements of said multiplex winding per slot being prime to the number of windings, and the remaining half of said winding elements being connected as a wave winding.

29. In combination, a multiplex lap winding, having $m$ windings, for dynamo electric machines of the type having a commutator, and means for preventing the potential difference between adjacent commutator segments from rising substantially above one $m$-th of the normal potential difference between every $m$-th segment during operation of the machine, comprising a wave winding connected to the same commutator.

30. In combination, a multiplex lap winding, having $m$ windings, for dynamo electric machines of the type having a commutator, and means for preventing the potential difference between adjacent commutator segments from rising substantially above one m-th of the normal potential difference between every m-th segment during operation of the machine, including active winding elements.

31. An armature winding, adapted to cooperate with field poles, including a multiplex lap winding and a wave winding connected to the same commutator, a coil of one of said lap windings having coil sides disposed in slots, a coil of another of said lap windings having coil sides disposed in slots similarly located with respect to said poles as said first named coil and a coil of said wave winding having its sides disposed in two of the before mentioned slots nearest to each other.

32. In an armature winding for a slotted armature, a commutator, armature coils connected to said commutator, every segment of said commutator being connected to two other segments through two armature coils generating substantially equal E. M. F.'s, said coils each having a side occupying a common slot.

33. In an armature winding for a slotted armature, a commutator, armature coils connected to said commutator, every segment of said commutator being connected to two pairs of segments through armature coils, each coil of a pair generating substantially the same E. M. F. as the other coil of the same pair, each coil of a pair having a side occupying a slot in common with a side of the other coil of the same pair.

34. In an armature winding for a slotted armature, a commutator, armature coils connected to said commutator, equipotential commutator bars being connected by two of said coils in series in which coils are generated substantially equal and opposite E. M. F.'s, said coils each having a side occupying a common slot.

35. In an armature winding for a slotted armature, a commutator, armature coils connected to said commutator, every two equipotential commutator bars 360 electrical degrees apart being connected respectively by two coils in series in which coils are generated approximately equal and opposite E. M. F.'s, said coils each having a side occupying a common slot.

In testimony whereof, the signature of the inventor is affixed hereto.

WILLIAM H. POWELL.

CERTIFICATE OF CORRECTION.

Patent No. 1,628,611.     Granted May 10, 1927, to

WILLIAM H. POWELL.

It is hereby certified that error appears in the printed specification of the above numbered patent requiring correction as follows: Page 7, line 41, claim 20, after the word "winding" insert a comma; line 48, same claim, strike out the words "potential difference" and insert instead "E. M. F."; line 83, claim 25, after the word "slots" insert a comma; and that the said Letters Patent should be read with these corrections therein that the same may conform to the record of the case in the Patent Office.

Signed and sealed this 21st day of June, A. D. 1927.

Seal.

M. J. MOORE.
Acting Commissioner of Patents.